United States Patent [19]

Keen

[11] Patent Number: 4,490,989

[45] Date of Patent: Jan. 1, 1985

[54] HELICOPTER HEATING AND AIR CONDITIONING SYSTEM

[75] Inventor: Jack H. Keen, Colorado Springs, Colo.

[73] Assignee: Aero Engineering Corporation, Clearwater, Fla.

[21] Appl. No.: 348,841

[22] Filed: Feb. 16, 1982

[51] Int. Cl.³ .......................... B60H 3/04; B60H 3/00; B64D 9/00; B64D 11/00

[52] U.S. Cl. .......................................... 62/243; 62/239; 165/43; 165/41; 244/118.5

[58] Field of Search ................. 165/43; 62/323.1, 239, 62/243, 323.4; 237/12.3 A; 244/118.5

[56] References Cited

U.S. PATENT DOCUMENTS

| | | |
|---|---|---|
| 2,473,496 | 6/1949 | Mayer . |
| 3,583,658 | 6/1971 | Herweg . |
| 3,971,511 | 7/1976 | Casey . |
| 3,981,206 | 9/1976 | Miranti . |

OTHER PUBLICATIONS

Comparison of Belts, Chains, Gears from Design Engineering Conference Paper, by Cheaney, Paullus & Raridan.

Product Engineering-Design Digest Issue Sep. 1959, pp. 210 to 213.

*Primary Examiner*—William R. Cline
*Assistant Examiner*—John K. Ford
*Attorney, Agent, or Firm*—Bernard, Rothwell & Brown

[57] ABSTRACT

An air conditioning and heating system for the cabin of a turbine-engine-powered helicopter includes an air conditioner with one or more evaporators, compressor and condenser, as well as an engine muff heater, for selectively feeding either hot or cooled air to cabin ducts. The system utilizes a single duct for intake of cold outside air for both the air conditioning condenser and for heating by the engine muff heater. A single fan having its motor in the cold air duct is provided to pull cold air through the condenser or push air through the heating system depending upon the setting of a valve in the cold air duct. The air conditioning compressor is uniquely mounted from the front end of the turbine engine drive shaft and driven by a grooved flat belt trained over crown pulleys.

1 Claim, 3 Drawing Figures

70
22
68
26
72
74
54
66
62
64
60
59
48
50
52
32
28
34
70
38
36
30
14
15
15
24
44
46
43
40
42
18
20
16

HELICOPTER HEATING AND AIR CONDITIONING SYSTEM

BACKGROUND OF THE INVENTION

1. Field of the Invention

This invention relates to improvements in systems for heating and air conditioning helicopter cabins and particularly cabins of helicopters of the type driven by turbine engines.

2. Prior Art

Helicopters are particularly difficult to provide with environmental control systems because of the crowded and cramped space within the craft which leaves little space for necessary components of heating and air conditioning systems. This is particularly true with modern day helicopters driven by turbine engines.

It is known in large turbine-engine-powered helicopters to provide heating and cooling by a heat pump system powered by a separate turbine driven from the main turbine engine. However such a system requires that the main engine by operating and this creates problems when the cabin needs to be heated or cooled when the engine is off. Moreover, the system takes considerable energy and is quite complex and expensive.

It is also known to heat helicopter cabins utilizing a muff heater around the exhaust section of a turbine engine as shown for example in the patent to A. J. Casey U.S. Pat. No. 3,971,511 granted July 27, 1976. This system of the Casey patent utilizes recirculated cabin air mixed with outside air and in the commercial embodiment, pulls the heated air through the muff heater by a fan with its motor in a hot air duct. This hot air environment is disadvantageous for both the life and operation of the fan motor. Moreover, the Casey system provides only for heating the cabin and not for cooling the same.

It has also been previously known to air condition a helicopter cabin using the conventional components of a refrigerant type air conditioning system, namely an evaporator, compressor and condenser. However, such was not incorporated with a heating system so that some of the same components could be used for both heating and cooling. Additionally, when attempting to drive an air conditioning compressor from a turbine engine with a forwardly extending drive shaft e.g., such as on a Bell Helicopter Model 206 series, there appears to be no suitable mounting space for the compressor or space to take off for the compressor drive.

SUMMARY OF THE INVENTION

This invention overcomes the above mentioned problems in prior art helicopter environmental systems and units by providing a simple and inexpensive heating and cooling system using known components for the most part, but arranged in a unique manner. The air conditioning system includes an evaporator, a compressor, and a condenser. The compressor is uniquely mounted and driven from an input quill drive shaft to the transmission at the front end of the turbine engine drive shaft through a crown pulley and flat belt arrangement. The compressor is mounted on the housing of a rotor transmission. The air conditioning condenser is cooled by cold air pulled in from the outside of the helicopter by a fan, or by movement of the helicopter through the air. The condenser cooling duct also selectively provides the inlet to a heating system which uses a muff heater and valve controlled ducting to deliver heated air to the cabin air ducts. The system is provided with controls so that it can deliver either heated or cooled air to the cabin delivery ducts.

DETAILED DESCRIPTION OF THE PREFERRED EMBODIMENT

Figure 1:
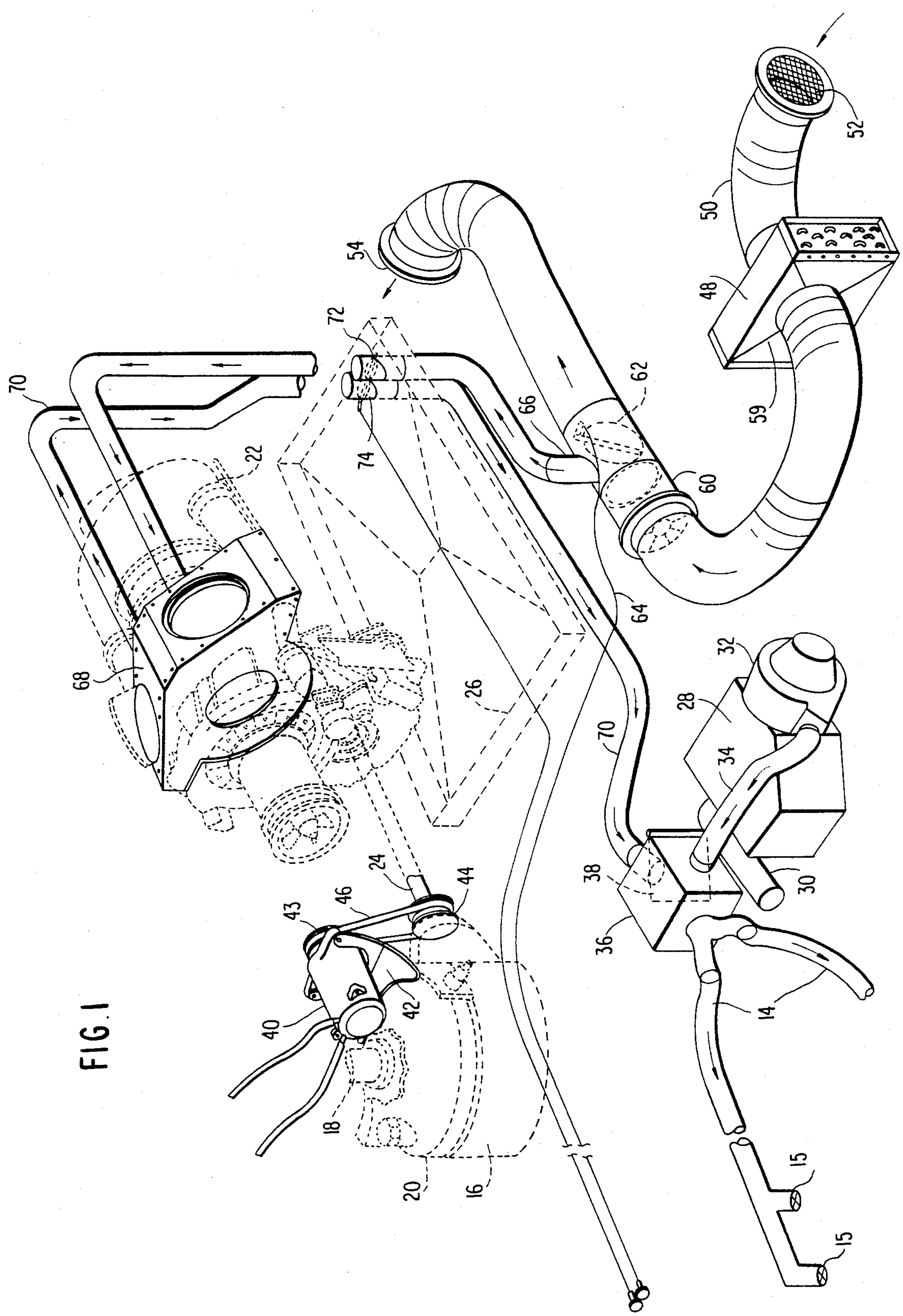
FIG. 1 is a perspective and schematic view of the helicopter heating and cooling system of this invention.

A helicopter of any known suitable type is the subject of the heating and cooling system of this invention. The particular helicopter shown is a Bell Model 206 series and the purpose of this invention is to provide environmentally controlled air to the helicopter cabin. In this connection the cabin is provided with air delivery ducts 14 which have individually controlled valved outlets 15 at appropriately positioned places within the cabin, the outlets being of a known type.

The helicopter rotor is driven through a transmission 16 which has a vertically extending rotor shaft 18. The transmission, of course, includes a transmission housing 20 in the aircraft.

The helicopter is driven from a turbine engine 22 which may be a Detroit Allison as shown. The turbine engine has a drive shaft 24 for connecting it to the transmission 16 for driving the helicopter rotor. Beneath the turbine engine there is a conventional oil pan 26. The Bell 206 series helicopter is, of course, provided with the turbine engine transmission and drive components previously described. This invention takes advantage of these components in their unique arrangement to provide for environmentally controlling the cabin. Such is done by providing both a heating system and cooling, or air conditioning system.

The air conditioning system is of the known type using a refrigerant which is cyclically evaporated, compressed, and condensed. It includes an evaporator 28 of known construction having an air inlet 30 which is in communication with the cabin air for returning cabin air through the evaporator. An evaporator fan 32 pulls the air through the evaporator and discharges it through cool air discharge duct 34 into a connection box 36. The connection box is connected through a Y connector to the cabin air delivery ducts 14. The connection box 36 also includes a damper valve 38 which may be selectively positioned for heating or for air conditioning. This damper may be provided with suitable manual or remote controls, now shown, for operation by the pilot.

Figure 3:
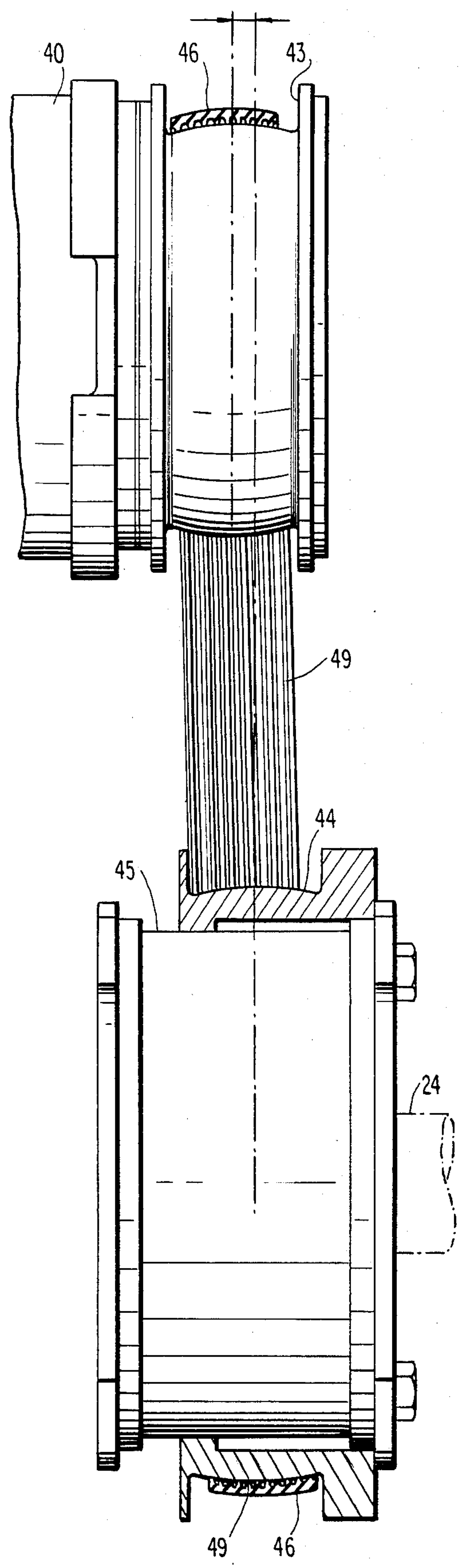
FIG. 3 is a sectional elevation view of the compressor drive pulleys and belt.

An air conditioning compressor 40 is a commercially available Sankyo International SD5 or any other suitable compressor, and it is supported by a uniquely positioned and arranged mounting bracket 42. The compressor is driven from a compressor pulley 43 which is shaped as a flat pulley having a crown surface, see FIG. 3.

Figure 2:
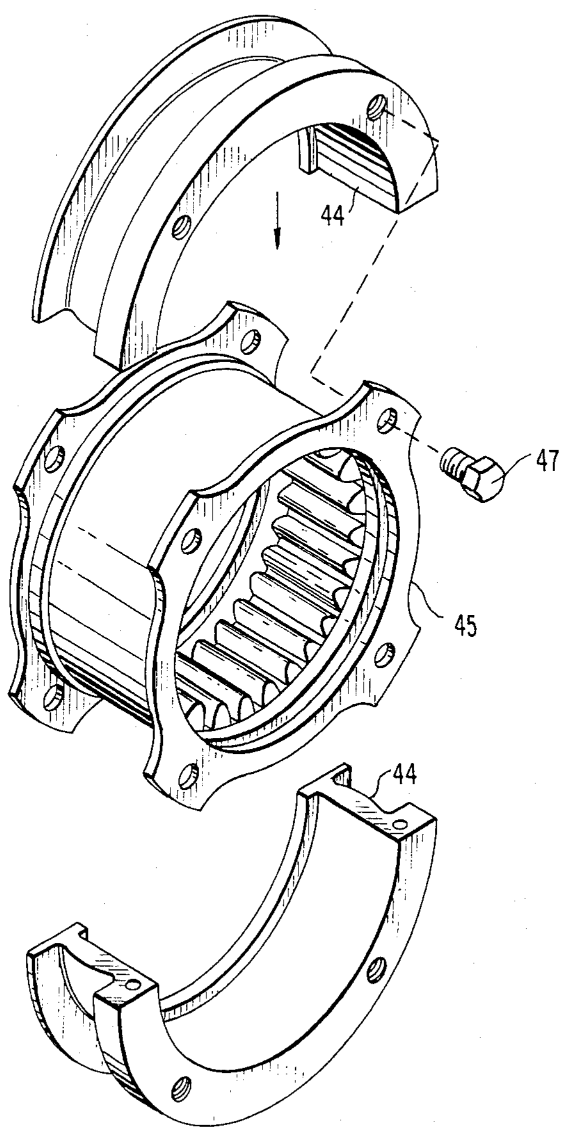
FIG. 2 is an exploded perspective schematic view of the mounting and drive for the compressor at the forward end of the engine shaft.

On the front end of drive shaft 24 and over the top of the hub 45 thereon there is positioned a split pulley 44 also flat and slightly crowned. The split pulley 44 is attached to the hub 45 by screws 47, see FIG. 2. For driving from the driven shaft to the compressor there is provided a unique flat belt 46 which has slight grooves 49 on its inner surface. Such belt is constructed from A-2 material commercially available under the Habasit trade name. Because of the arrangement of the pulleys, and the belt, the belt tends to align on the crown of the pulleys even if the pulleys are slightly out of line, as they may become from time-to-time, due to movement of the aircraft components, see FIG. 3.

The air conditioning also includes a conventional condenser 48 having shrouds 59 on opposite sides thereof. This condenser is positioned in a cold air duct 50. The cold air duct has an inlet 52 on the side of the helicopter with a scoop, not shown, for scooping in air as the helicopter is moving forward and has an outlet 54 on the other side of the helicopter for discharging air, also with a shrouded outlet, not shown. A vane-type axial flow fan 60 having an inline motor is positioned in the cold air duct 50 for pulling the cold air over the condenser.

Also positioned in the cold air duct is a butterfly valve 62 having a control 64 to move the valve to either block the outlet 54 of the cold air duct or to allow cold air to pass through it. Immediately upstream in the cold air duct from the butterfly valve 62 is a heater intake duct 66. When the valve 62 is closed air is directed to the heater intake duct 66.

For heating air there is provided a muff heater 68 in the form of an enclosure for the exhaust section of the turbine engine having outlets therein for the exhaust stack. The particular muff shown is generally similar to that shown in the Casey U.S. Pat. No. 3,971,511.

A heated air outlet duct 70 leads back to the connection box 36. Firewall shut-off valves 72 and 74 are provided in the heater inlet and outlet ducts respectively.

In operation, for heating the helicopter cabin, the pilot would set the damper to block off the outlet from the cold air discharge 34 into the connection box 36 and would set the butterfly valve 62 to block the cold air duct 50 and cause cold air to enter the muff enclosure 68. The fan 60 would draw cold air into the system passing it over the fan and pushing it through the heater intake duct 66 through the muff heater 68 and through the heater outlet duct 70 into the connection box 36 and then to the cabin air delivery ducts 14 so that heated air is delivered to the cabin as required. This heated air and the heater can operate any time that the exhaust section of the engine is hotter than ambient, and the engine does not need to necessarily be turned on.

For air conditioning, one or more evaporators, compressor, and condenser work as in conventional air conditioning and refrigeration systems with the condenser condensing the vaporized refrigerant, the compressor compressing it, and the evaporator evaporating it to accomplish the cooling. The condenser itself is cooled by the cool air pulled through duct 50 by motor 60. The compressor is driven in a unique manner from the special split crown pulley attached to the front portion of the turbine engine drive shaft 24. The evaporator fan 32 blows the cooled air through cool air discharge 34 and connection box 36 into the cabin air delivery ducts 14.

Although a particular system has been described with regard to one particular model helicopter and particular turbine engine, the system and the invention would have applicability for any other system with the components similarly situated.

What is claimed is:

1. In a helicopter air conditioning system for a helicopter of the type having a turbine engine with a forwardly extending drive shaft driving a transmission contained in a transmission housing which transmission in turn drives a helicopter rotor, improved means for mounting and driving an air conditioning compressor from a cylindrical hub on the end of the drive shaft, comprising;

(a) a two part split crown pulley, (b) screw means fixedly attaching the split crown pulley to the cylindrical hub on the end of the drive shaft, (c) a bracket mounting the compressor on the housing of the transmission, (d) a crown pulley attached to a drive shaft for the compressor and generally aligned with the pulley on the turbine engine drive shaft, (e) a flat pulley belt having a plurality of grooves on the inner surface thereof positioned around and in contact with the crown pulleys so that the belt tends to align itself on the crowns of the pulleys even when the pulleys get out of line.

* * * * *

UNITED STATES PATENT AND TRADEMARK OFFICE

CERTIFICATE OF CORRECTION

PATENT NO. : 4,490,989

DATED : January 1, 1985

INVENTOR(S) : Jack H. Keen

It is certified that error appears in the above-identified patent and that said Letters Patent is hereby corrected as shown below:

Column 1, line 22, delete "by" and substitute therefor -- be --.

Signed and Sealed this

*Thirtieth* Day of *July 1985*

[SEAL]

*Attest:*

DONALD J. QUIGG

*Attesting Officer* *Acting Commissioner of Patents and Trademarks*